US008353004B2

(12) United States Patent  (10) Patent No.: US 8,353,004 B2
Senga et al.  (45) Date of Patent: Jan. 8, 2013

(54) AUTHENTICATION DEVICE, AUTHENTICATION METHOD, AUTHENTICATION PROGRAM AND COMPUTER READABLE RECORDING MEDIUM

(75) Inventors: Masahiro Senga, Kyoto (JP); Takashi Kakiuchi, Kusatsu (JP)

(73) Assignee: OMRON Corporation, Kyoto (JP)

( * ) Notice: Subject to any disclaimer, the term of this patent is extended or adjusted under 35 U.S.C. 154(b) by 933 days.

(21) Appl. No.: 11/724,582

(22) Filed: Mar. 15, 2007

(65) Prior Publication Data

US 2007/0226509 A1   Sep. 27, 2007

(30) Foreign Application Priority Data

Mar. 15, 2006   (JP) .................................. 2006-071849

(51) Int. Cl.
*G06F 21/00*   (2006.01)
(52) U.S. Cl. ........................................................... 726/2
(58) Field of Classification Search .................. 713/176, 713/186, 161; 726/2
See application file for complete search history.

(56) References Cited

U.S. PATENT DOCUMENTS

| | | | |
|---|---|---|---|
| 6,690,814 B1 | 2/2004 | Yuasa et al. | |
| 2001/0019620 A1 | 9/2001 | Nagai et al. | |
| 2004/0042644 A1 | 3/2004 | Yuasa et al. | |
| 2005/0146620 A1 | 7/2005 | Monroe et al. | |
| 2006/0204050 A1* | 9/2006 | Takizawa | 382/115 |
| 2007/0002157 A1* | 1/2007 | Shintani et al. | 348/333.06 |

FOREIGN PATENT DOCUMENTS

| | | |
|---|---|---|
| JP | 9-251534 | 9/1997 |
| JP | 2000-259814 | 9/2000 |
| JP | 2001-243466 A | 9/2001 |
| JP | 2003-178306 | 6/2003 |
| JP | 2003-178306 A | 6/2003 |
| KR | 2000-0056563 A | 9/2000 |
| KR | 10-0467152 B1 | 1/2005 |
| WO | 2005/043332 A2 | 5/2005 |

OTHER PUBLICATIONS

Notice to Submit an Opinion issued in Korean Application No. 10-2007-0017331 mailed on Aug. 8, 2008 and English translation thereof, 8 pages.
Extended European Search Report for European Application No. 07104037.2-1224 dated Oct. 26, 2009, 6 pages.
Frischholz R. W. et al: "Avoiding Replay-Attacks in a Face Recognition System Using Head-Pose Estimation" Analysis and Modeling of Faces and Gestures, 2003. AMFG 2003. IEEE International Workshop on Oct. 17, 2003, Piscataway, NJ, USA, IEEE, Jan. 1, 2003, pp. 234-235, XP010664370 ISBN: 978-0-7695-2010-0.
Japanese Office Action issued in Japanese Application No. 2006-071849 dated Sep. 27, 2011 and English translation thereof, 5 pages.
European Office Action issued in European Application No. 07104037.2 dated Jul. 2, 2012, 7 pages.
Gee, A et al., "Determining the gaze of faces in images", Image an Vision Computing, Butterworth-Heinemann Ltd. 1994, pp. 639-647.
Horprasert T. et al., "Computing 3-D Head Orientation from a Monocular Image Sequence," Proc. of the 2. Int. Conf. on Face and Gesture Recognition, pp. 242-247.

* cited by examiner

*Primary Examiner* — Brandon Hoffman
*Assistant Examiner* — Anthony Brown
(74) *Attorney, Agent, or Firm* — Osha Liang LLP

(57) ABSTRACT

An authentication device having high resistance to spoofing is provided. The portable telephone includes a camera of imaging the face of the person to be authenticated, an imaging direction comparing unit of determining whether or not the face of the person to be authenticated is imaged from diagonally below, and a main control unit of determining that the person to be authenticated is not the person in question when the imaging direction comparing unit determines that the face of the person to be authenticated is not imaged from diagonally below.

11 Claims, 6 Drawing Sheets

AUTHENTICATION DEVICE, AUTHENTICATION METHOD, AUTHENTICATION PROGRAM AND COMPUTER READABLE RECORDING MEDIUM

BACKGROUND OF THE INVENTION

1. Field of the Invention

The present invention relates to an authentication device and authentication method for performing identity verification based on the imaged image of the person to be authenticated.

2. Description of the related art

The need for security strengthening is increasing with widespread use of portable terminals and strengthening of functions. In particular, ensuring of security is an absolute requirement when functions directly related to financial transactions such as electronic money are equipped.

In order to respond to such need, a living body authentication in which ensuring of security is easier is proposed in addition to security measures such as personal identification number and password of the prior art. Among them, face authentication is an identification method normally performed by people in ordinary living, and is often adopted since psychological resistance is small, it can be achieved with small investment since devices that can perform imaging are increasing with widespread use of CCD (Charge Coupled Device) camera etc.

However, similar to other authentication methods, a person other than the person in question (original person to be authenticated) pretends to be the person in question in face authentication. That is, in the conventional face authentication device, the image for authentication is acquired by imaging the person to be authenticated from the front, but the picture of the person in question taken from the front is relatively easy to obtain. Thus, a person can pass oneself to be the person in question by using the photo taken from the front.

FIG. 8 is a view explaining the method of carrying out spoofing using the photo of the person in question. As shown in FIG. 8, when carrying out spoofing using the photo of the person in question, the photo 52 with the face 53 of the person in question is arranged in front of the camera 51 of the portable telephone 50 and the photo 52 is imaged. Spoofing is carried out by performing such imaging and disguising as if imaging the face of the person in question.

In order to solve such problem, a device for preventing mistaken authentication due to spoofing by using the image imaged from a direction other than from the front in face authentication has been developed.

For example, in a personal authentication device disclosed in Japanese Laid-Open Patent Publication No. 2003-178306 (published Jun. 27, 2003), the face of the person to be authenticated is imaged from a specific direction defined in advance other than from the front, and the imaged image is registered in an authentication dictionary. In time of authentication, determination is made on whether or not the person to be authenticated is the person in question by checking the face image of the face to be authenticated imaged from the specific direction and the image registered in the authentication dictionary.

Although it is not the device for identity verification, the invention for performing human authentication by imaging the image of a human from below includes an image processing device disclosed in Japanese Laid-Open Patent Publication No. 2000-259814 (published Sep. 22, 2000). In such image processing device, an image input unit for imaging the image of the human from diagonally below is arranged, and human authentication is performed based on the image acquired by the image input unit. The face image of the target person can be reliably obtained even if the height of the target person varies by imaging from diagonally below.

An invention of a method for extracting feature points of the face from the image for face authentication includes a feature point extracting method disclosed in Japanese Laid-Open Patent Publication No. 9-251534 (published Sep. 22, 1997).

SUMMARY OF THE INVENTION

The conventional authentication device has an imaging unit fixed so as to image from below, whereas the positional relationship between the camera and the face of the person to be authenticated easily changes in the authentication device that uses a portable terminal. When forcing the user of the portable terminal to image the face of the person to be authenticated always from a constant direction, it becomes a great burden on the part of the user. Thus, it is difficult to apply the conventional configuration to the authentication device that uses the camera of the portable terminal.

In the conventional configuration, the registered image imaged from a defined imaging direction must be registered, which registration of the registered image becomes troublesome, and the direction of the face in time of registration and in time of authentication must be matched. Furthermore, to which direction the imaging direction is fixed can be easily checked, and thus the possibility of the spoofing being carried out becomes high.

The present invention, in view of solving the above problems, aims to provide an authentication device and an authentication method having high resistance to spoofing that is applicable to the authentication device that uses the portable terminal.

In order to achieve the above aim, an authentication device according to the present invention relates to an authentication device for performing individual verification by imaging the face of the person to be authenticated; the authentication device including an imaging unit for imaging the face of the person to be authenticated; an imaging direction determining unit for determining whether the imaging unit imaged the face of the person to be authenticated from diagonally below with respect to the face; and a determining unit for determining the person to be authenticated is not the person in question when the imaging direction determining unit determines that the imaging unit did not image the face of the person to be authenticated from diagonally below with respect to the face.

In order to achieve the above aim, an authentication device according to the present invention relates to an authentication method by the authentication device performing identity verification by imaging the face of the person to be authenticated, the method of including imaging step of imaging the face of person to be authenticated by the imaging unit of the authentication device; imaging direction determining step of determining whether the imaging unit images the face of the person to be authenticated from diagonally below with respect to the face; and determining step of determining that the person to be authenticated is not the person in question when determined in the imaging direction determining step that the imaging unit did not image the face of the person to be authenticated from diagonally below with respect to the face.

Normally, the imaging unit is arranged in front of the photo when carrying out spoofing using the photo of the person in question (original person to be authenticated).

According to the above configuration, the imaging direction determining unit determines whether the imaging unit images the face of the person to be authenticated from diagonally below with respect to the face. The determining unit determines that the person to be authenticated is not the person in question when the imaging direction determining unit determines that the imaging unit did not image the face of the person to be authenticated from diagonally below with respect to the face.

That is, authentication is not performed unless the face of the person to be authenticated is imaged from diagonally below. Authentication is not performed if the photo of the person in question is imaged from the front to carry out spoofing.

The imaging direction is used with the imaging direction as the reference in determining whether or not the spoofing is being carried out, thereby enhancing the resistance to spoofing.

Direction of diagonally below is the imaging direction of when imaged from the position of capturing the jaw of the person to be authenticated at substantially the front with the imaging direction of the imaging unit forming an elevation angle with respect to the horizontal direction when the person to be authenticated holds the authentication device including the imaging unit with his/her face parallel to the vertical direction.

The authentication device further includes an image analyzing unit for analyzing an authentication image, which is an image of the face of the person to be authenticated, acquired by the imaging unit, and determining the orientation of the face in the authentication image; where the imaging direction determining unit determines the imaging direction of the imaging unit based on the analysis result of the image analyzing unit.

According to such configuration, the image analyzing unit determines the orientation of the face of the person to be authenticated by analyzing the authentication image, and the direction determining unit determines the imaging direction of the imaging unit based on the determination result. Therefore, the imaging direction is determined using the authentication image that is used in the conventional authentication device, whereby the imaging direction can be determined without newly acquiring information necessary for determining the imaging direction.

The image analyzing unit includes a position detecting unit for extracting position information indicating the position of a plurality of features of the face in the authentication image; a relative position calculating unit for calculating a relative position index indicating the relative positional relationship of the feature based on the position information extracted by the position detecting unit; and a face direction determining unit for determining the orientation of the face in the authentication image based on the relative position index calculated by the relative position calculating unit.

According to such configuration, the position detecting unit extracts position information indicating the position of a plurality of features of the face in the authentication image such as outline of face, eye, nose and mouth. Furthermore, the relative position calculating unit calculates the relative position index based on the position information. The face direction determining unit determines the orientation of the face in the authentication image based on the relative position index.

Consequently, the imaging direction is thereby determined based on the orientation of the face of the person to be authenticated in the authentication image, and the imaging direction can be accurately determined even if the user freely changes the imaging direction.

In order to achieve the aim, the authentication device according to the present invention relates to an authentication device for performing identity verification by imaging the face of the person to be authenticated; the authentication device including an imaging unit for imaging the face of the person to be authenticated; a tilt detecting unit for detecting the tilt with respect to the horizontal plane of the imaging unit; and a determining unit for determining that the person to be authenticated is not the person in question when the tilt detecting unit detects that the imaging direction of the imaging unit of when imaging the face of the person to be authenticated does not form an elevation angle with respect to the horizontal plane.

In order to achieve the aim, the authentication method according to the present invention relates to an authentication method by the authentication device performing identity verification by imaging the face of the person to be authenticated, the method of including imaging step of imaging the face of person to be authenticated by the imaging unit of the authentication device; tilt detecting step of detecting the tilt with respect to the horizontal plane of the imaging unit in the imaging step; and determining step of determining that the person to be authenticated is not the person in question when the tilt detecting unit determines that the imaging direction of the imaging unit in the imaging step does not form an elevation angle with respect to the horizontal plane.

When carrying out spoofing using the photo of the person in question (original person to be authenticated), the imaging unit is normally arranged in front of the photo. In this case, the imaging direction of the imaging unit thus often becomes parallel to the horizontal plane or forms a depression angle with respect to the horizontal plane.

According to such configuration, the tilt detecting unit detects the tilt with respect to the horizontal plane of the imaging unit when imaging the face of the person to be authenticated, and the determining unit determines that the person to be authenticated is not the person in question when the imaging direction of the imaging unit of when imaging the face of the person to be authenticated forms an elevation angle with respect to the horizontal plane.

Therefore, the imaging direction can be used as a reference in determining whether or not spoofing is being carried out, thereby enhancing the resistance to spoofing.

An authentication program for operating the authentication device according, the authentication program functioning the computer as each unit; and a computer readable recording medium recorded with the authentication program are also encompassed within the technical scope of the present invention.

Therefore, the authentication device according to the present invention includes an imaging unit for imaging the face of the person to be authenticated; an imaging direction determining unit for determining whether the imaging unit imaged the face of the person to be authenticated from diagonally below with respect to the face; and a determining unit for determining the person to be authenticated is not the person in question when the imaging direction determining unit determines that the imaging unit did not image the face of the person to be authenticated from diagonally below with respect to the face.

Furthermore, the authentication device according to the present invention includes an imaging unit for imaging the face of the person to be authenticated; a tilt detecting unit for detecting the tilt with respect to the horizontal plane of the imaging unit; and a determining unit for determining that the person to be authenticated is not the person in question when the tilt detecting unit detects that the imaging direction of the imaging unit of when imaging the face of the person to be authenticated does not form an elevation angle with respect to the horizontal plane.

The authentication method according to the present invention includes imaging step of imaging the face of person to be authenticated by the imaging unit of the authentication device; imaging direction determining step of determining whether the imaging unit images the face of the person to be authenticated from diagonally below with respect to the face; and determining step of determining that the person to be authenticated is not the person in question when determined in the imaging direction determining step that the imaging unit did not image the face of the person to be authenticated from diagonally below with respect to the face.

The authentication method according to the present invention includes imaging step of imaging the face of person to be authenticated by the imaging unit of the authentication device; tilt detecting step of detecting the tilt with respect to the horizontal plane of the imaging unit in the imaging step; and determining step of determining that the person to be authenticated is not the person in question when the tilt detecting unit determines that the imaging direction of the imaging unit in the imaging step does not form an elevation angle with respect to the horizontal plane.

Therefore, the imaging direction can be used as a reference in determining whether or not spoofing is being carried out, thereby enhancing the resistance to spoofing.

DETAILED DESCRIPTION OF THE PREFERRED EMBODIMENTS

One embodiment of the present invention will now be described based on FIGS. 1 to 7. A portable telephone 1 will be described by way of example of an authentication device of the present invention. The portable telephone 1 performs authentication of the user, and has the application execute a predetermined process when authentication is successful.

The application may be for e-mail reception and billing and settlement, but is not limited thereto. The application may be contained in the portable telephone 1, or may be contained in the external device that communicates with the portable telephone 1. The external device is a device possessed by a person who requires the authentication result of the user, and may be a computer possessed by a supplier that sells products, credit card companies or the like.

(Configuration of Portable Telephone 1)

Figure 1:
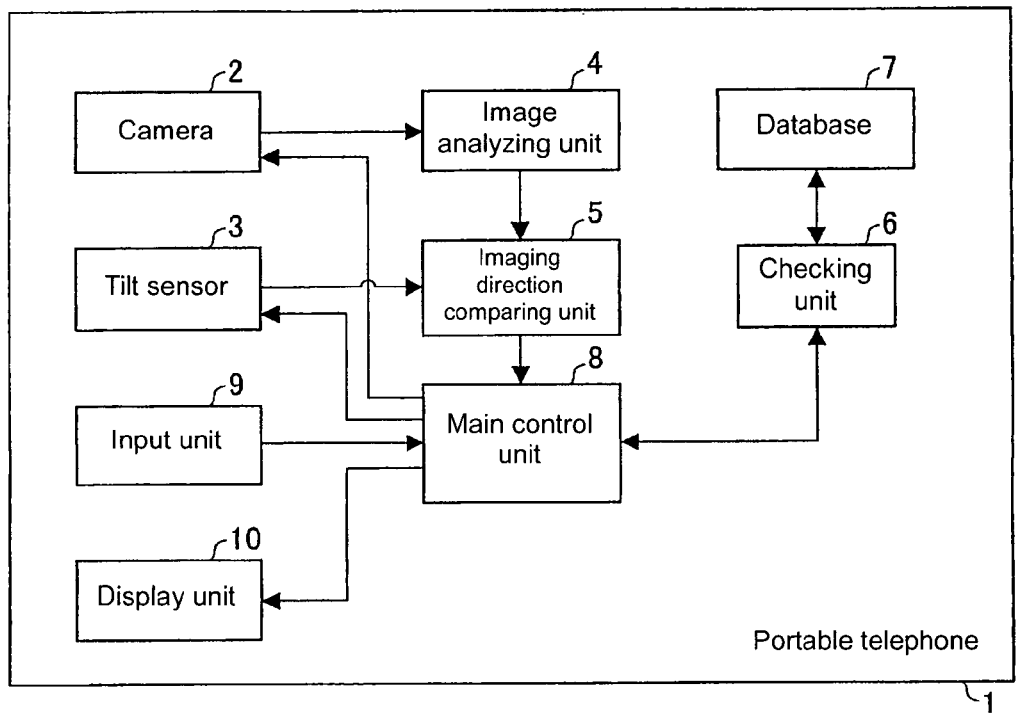
FIG. 1 shows a schematic view showing a configuration of a portable telephone of one embodiment.

FIG. 1 is a schematic view showing a configuration of the portable telephone 1. As shown in FIG. 1, the portable telephone 1 includes a camera 2 (imaging unit), a tilt sensor 3 (tilt detecting unit), an image analyzing unit 4 (image analyzing unit), an imaging direction comparing unit 5, a checking unit 6, a database 7, and a main control unit 8 (determining unit). The portable telephone 1 also includes a communication unit, a microphone and a speaker, but the configurations thereof are omitted in FIG. 1.

The camera 2 is an imaging unit for imaging the image (hereinafter referred to as authentication image) of the face of the user or the person to be authenticated. The camera 2 is a CCD camera and the like, and is operated by the user through an input unit 9. The authentication image acquired by the camera 2 is output to the image analyzing unit 4.

Figure 2:
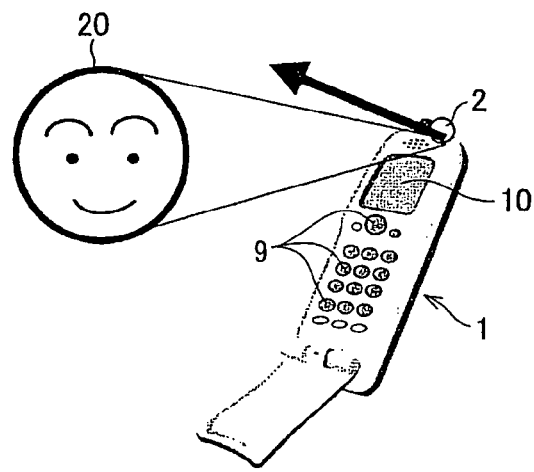
FIG. 2 shows a view showing the outer appearance of the portable telephone of one embodiment.

FIG. 2 is a view showing the outer appearance of the portable telephone 1. As shown in FIG. 2, the camera 2 is preferably arranged on the surface on the same side as the surface arranged with the input unit 9 and a display unit 10 of the portable telephone 1 to easily image the face 20 of the user.

The tilt sensor 3 is a sensor for detecting the tilt of the portable telephone 1, and is a three axis acceleration sensor or a gyro sensor incorporated in a GPS (Global Positioning System) device and the like. The tilt sensor 3 detects the tilt with respect to a horizontal direction of the portable telephone 1, and outputs the information of the relevant tilt to the imaging direction comparing unit 5. That is, the tilt sensor 3 detects at what angle the user is holding the portable telephone 1.

The image analyzing unit 4 analyzes the authentication image and determines the imaging direction of the camera 2 from the orientation of the face. Details of the image analyzing unit 4 will be hereinafter described. The determination result of the image analyzing unit 4 is output to the imaging direction comparing unit 5.

The imaging direction comparing unit 5 finally determines the imaging direction of the camera 2 based on the determination result of the image analyzing unit 4 and the tilt information from the tilt sensor 3, and determines whether or not the imaging direction is downward (direction from diagonally below to diagonally upward), that is, whether imaging is performed from diagonally below. The imaging direction comparing unit 5 outputs the determination result to the main control unit 8.

In this case, the imaging direction of the camera 2 indicates from which direction the face of the person to be authenticated is imaged, and shows the positional relationship between the face of the person to be authenticated and the camera 2.

Figure 3:
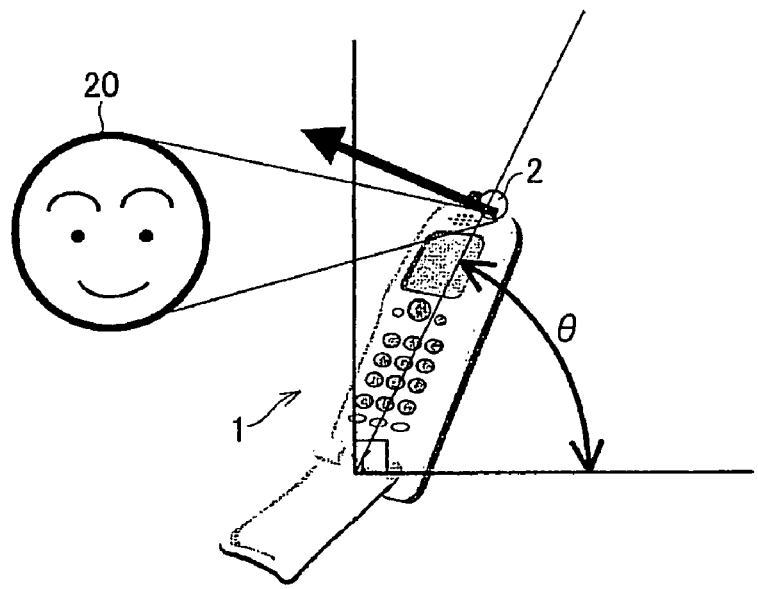
FIG. 3 shows a view showing the tilt of the portable telephone of one embodiment.

FIG. 3 is a view showing the tilt of the portable telephone 1. As shown in FIG. 3, the user does not hold the portable telephone right in front of his/her face 20 when operating the portable telephone 1, and often holds the portable telephone 1 at the position lowered from the position of the face and holds the upper part (end on the side the camera 2 is arranged in FIG. 3) of the ends of the portable telephone 1 in a state tilted in a direction away from the face. The imaging direction of when imaging in such state is defined as downward.

In other words, downward direction is the imaging direction of when the imaging direction of the portable telephone 1 forms an elevation angle with respect to the horizontal direction, that is, when the angle (angle θ in FIG. 3) formed on the side of the surface opposite the surface arranged with the camera 2 of the angle of the portable telephone 1 with respect to the horizontal direction is smaller than 90 degrees on the upper side in the vertical direction when the user holds the portable telephone 1 with his/her face parallel to the vertical direction. When the face of the user is tilted with respect to the vertical direction, the imaging axis connecting the camera 2 and the user is similarly tilted so that the relative position of the face of the user and the camera 2 does not change.

Furthermore, the imaging direction of when imaged with the camera 2 arranged in front of the face of the user is defined as the front direction, and the imaging direction in which the imaging direction of the portable telephone 2 forms a depression angle with respect to the horizontal direction as the upward direction.

As shown in FIG. 1, the image in which the face of the user is imaged (hereinafter referred to a registered image) is stored in advance in a database 7. The registered image may be acquired by the camera 2 or may be acquired by a different imaging device.

The checking unit 6 checks the authentication image acquired by the camera 2 and the registered image stored in the database 7, and determines whether the person to be authenticated is the person in question based on the similarity of the images.

A checking method in the checking unit 6 is not particularly limited. Check may be performed by extracting the feature value from the face region of the authentication image, and checking the feature value and the feature value extracted from the face region of the registered image.

When receiving a check command output from the main control unit 8, the checking unit 6 performs the checking process and outputs the check result to the main control unit 8.

When receiving the check result from the checking unit 6, the main control unit 8 outputs the check results to the application. If authentication fails, the main control unit 8 may notify the authentication failed result via the display unit 10.

(Configuration of Image Analyzing Unit 4)

Figure 4:
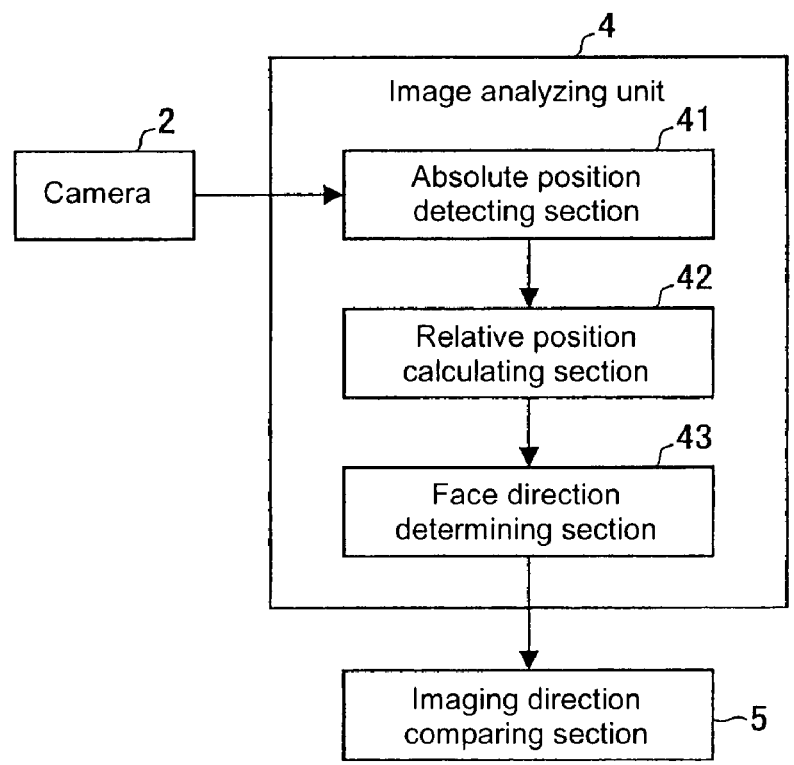
FIG. 4 shows a schematic view showing the configuration of an image analyzing unit.

The configuration of the image analyzing unit 4 will now be described with reference to FIG. 4. FIG. 4 is a schematic view showing the configuration of the image analyzing unit 4. As shown in FIG. 4, the image analyzing unit 4 includes an absolute position detecting section 41 (position detecting unit), a relative position calculating section 42 (relative position calculating unit), and a face direction determining section 43 (face direction determining unit).

The absolute position detecting section 41 detects the absolute position of the features (parts) of the face in the authentication image. The features include outline of the face, eyes, mouth and nose. A method of detecting the position of the features is not particularly limited, and the method disclosed in Japanese Laid-Open Patent Publication No. 9-251534 and the like may be used. In such method, feature point extraction is performed by a combination of checking of a separation degree filter for extracting the region of a specific shape such as circle, ellipse and the like and a template pattern.

Figure 5:
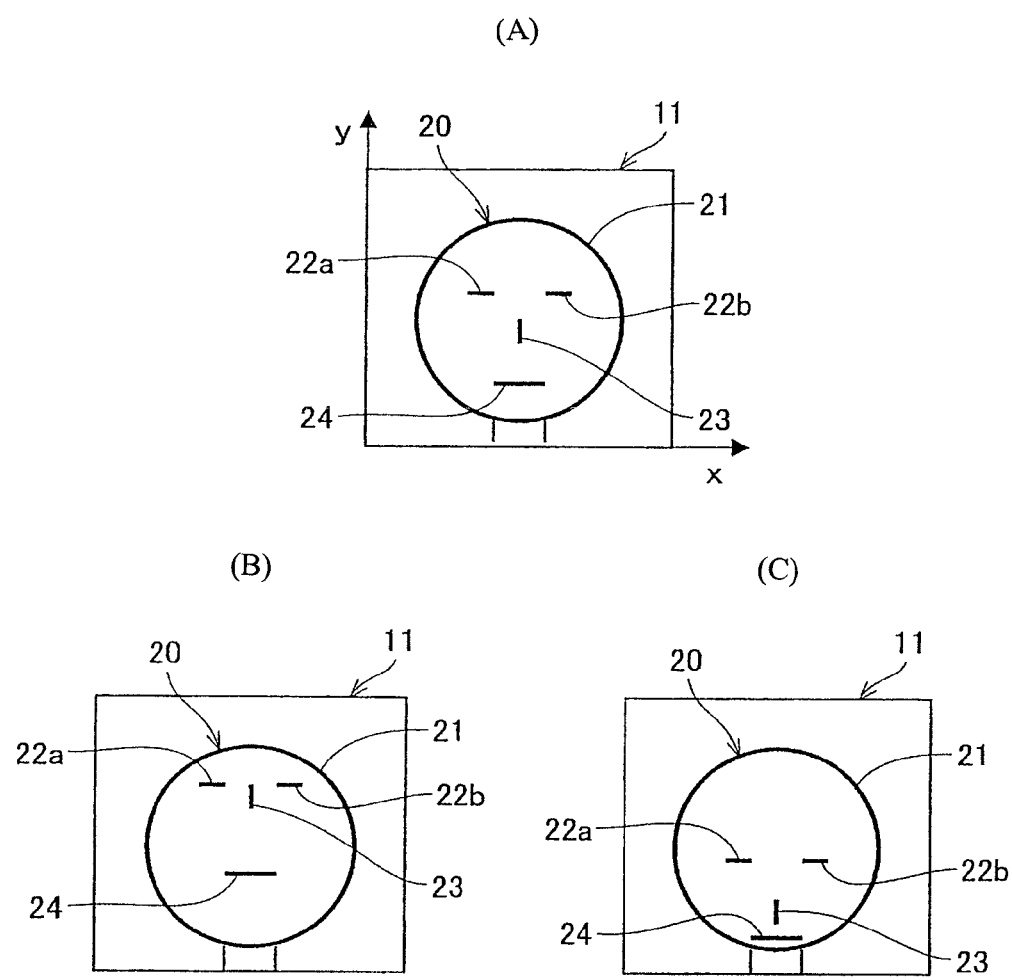
FIGS. 5A-5C show views explaining the position of features of the face where A shows a view showing the image in which the face of the person to be authenticated is facing the front, B shows a view showing the image in which the face of the person to be authenticated is facing upward, and C shows a view showing the image in which the face of the person to be authenticated is facing downward.

FIG. 5 is a view explaining the position of the features of the face. As shown in FIG. 5A, a lower left corner of the authentication image 11 is the origin, the side extending from the relevant corner to a lower right corner is set as the X-axis, and the side extending from the lower left corner to the upper left corner is set as the Y-axis, whereby the position of each feature is defined by X coordinate and Y coordinate.

The absolute position detecting section 41 outputs the information (position information) of the position (coordinate) of the extracted feature to the relative position calculating section 42.

The relative position calculating section 42 calculates a value (hereinafter referred to as relative position index) indicating the relative positional relationship between the features based on the position information extracted by the absolute position detecting section 41. The relative position calculating section 42 outputs the calculated relative position index to the face direction determining section 43. The details of the relative position index will be hereinafter described.

The face direction determining section 43 determines whether the relative position index of the eye, mouth and nose calculated in the relative position calculating section 42 is within a predetermined range, and determines the orientation (imaging direction) of the face depending on whether all the relative position indexes are within the predetermined position. The face direction detecting section 43 outputs the determination result to the imaging direction comparing unit 5.

(Calculating Method in Relative Position Calculating Section 42)

The method of calculating the relative position index in the relative position calculating section 42 will now be described in detail.

First, a specific coordinate is extracted from the coordinate of the feature output from the absolute position detecting section 41. That is, the Y coordinate of the portion having the largest Y coordinate is assumed as Y outline_upper and the Y coordinate of the portion having the smallest Y coordinate as Y outline_lower regarding the outline 21, the Y coordinate of the right eye 22a as Y eye_left, the Y coordinate of the left eye 22b as Y eye_right, the Y coordinate or the portion having the largest Y coordinate as Y nose_upper and the Y coordinate of the portion having the smallest Y coordinate as Y nose_lower regarding the nose 23, and the Y coordinate of the mouth 24 as Y mouth.

The length (H out) in the Y axis direction of the outline 21, the position (Y coordinate) (H eye) of the eye, the position (Y coordinate) (H nose) of the nose are calculated as below.

$$H\ out = Y\ outline\_upper - Y\ outline\_lower$$

$$H\ eye = (Y\ eye\_left + Y\ eye\_right)/2$$

$$H\ nose = (Y\ nose\_upper + Y\ nose\_lower)/2$$

That is, the length in the Y axis direction of the outline 21 is calculated by subtracting the Y coordinate of the portion having the smallest Y coordinate from the Y coordinate of the portion having the largest Y coordinate of the outline 21. The Y coordinate of the eye is calculated by calculating the average of the Y coordinate of the right eye 22a and the Y coordinate of the left eye 22b. Furthermore, the Y coordinate of the nose is calculated by calculating the average value of the Y coordinate of the portion having the largest Y coordinate and the Y coordinate of the portion having the smallest Y coordinate of the nose 23.

1) R eye, which is the ratio of the length of the outline 21 with respect to the difference between the Y coordinate of the eye and the Y outline_lower, 2) R nose, which is the ratio of the length of the outline 21 with respect to the difference between the Y coordinate of the nose and the Y outline_lower, and 3) R mouth which is the ratio of the length of the outline 21 with respect to the difference between the Y coordinate of the mouth and the Y outline_lower are then calculated.

That is, R eye, R nose, and R mouth, which are relative position indexes indicating the relative positional relationship of each feature with respect to the upper end of the outline 21 are calculated with the following equations.

$$R\text{ eye}=(H\text{ eye}-Y\text{ outline\_lower})/H\text{ out}$$

$$R\text{ nose}=(H\text{ nose}-Y\text{ outline\_lower})/H\text{ out}$$

$$R\text{ mouth}=(Y\text{ mouth}-Y\text{ outline\_lower})/H\text{ out}$$

That is, R eye, R nose, and R mouth are values indicating how close the eye, the nose and the mouth are to the upper end of the outline 21, meaning that the eye, the nose and the mouth are closer to the upper end of the outline 21 as the values become larger.

The relative position calculating section 42 outputs each relative position index of R eye, R nose, and R mouth to the face direction determining section 43.

(Direction Determining Method in Face Direction Determining Section 43)

The face direction determining section 43 determines the orientation (imaging direction) of the face from the magnitude of each relative position index of R eye, R nose, and R mouth output from the relative position calculating section 42. The range that may be taken by each relative position index is divided into three ranges (first to third range), and the face direction determining section 43 determines the imaging direction based on to which range each relative position index falls.

That is, the face direction determining section 43 determines the imaging direction as downward direction if the relative position index is in the first range, the imaging direction as front direction if in the second range, and the imaging direction as upward direction if in the third range.

In other words, a divided range obtained by dividing the range the relative position index may take is defined, and the imaging direction is associated with respect to the relevant divided range. The face direction determining section 43 determines the imaging direction by determining to which divided range the relative position index is contained.

Specifically, $0.8 < R\text{ eye} \leq 1.0$ (first range), $0.6 < R\text{ eye} \leq 0.8$ (second range), and $R\text{ eye} \leq 0.6$ (third range) are set with regard to R eye; $0.7 < R\text{ nose} \leq 1.0$ (first range), $0.4 < R\text{ nose} \leq 0.7$ (second range) and $R\text{ nose} \leq 0.4$ (third range) are set with regard to R nose; and $0.3 < R\text{ mouth} \leq 0.5$ (first range), $0.1 < R\text{ mouth} \leq 0.3$ (second range), and $R\text{ mouth} \leq 0.1$ (third range) are set with regard to R mouth.

When determining the imaging direction based on the three relative position indexes of R eye, R nose and R mouth, the face direction determining section 43 performs at least 1) of the following three processes.

1) The face direction determining section 43 determines whether all of the relative position indexes are within the first range.

$$0.8 < R\text{ eye} \leq 1.0$$

$$0.7 < R\text{ nose} \leq 1.0$$

$$0.3 < R\text{ mouth} \leq 0.5$$

If all of the relative position indexes satisfy the above equation, the face direction determining section 43 determines that the authentication image is that imaged from the downward direction (face is facing upward, state shown in FIG. 5B).

2) The face direction determining section 43 determines whether all of the relative position indexes are within the second range.

$$0.6 < R\text{ eye} \leq 0.8$$

$$0.4 < R\text{ nose} \leq 0.7$$

$$0.1 < R\text{ mouth} \leq 0.3$$

If all of the relative position indexes satisfy the above equation, determination is made that the authentication image is that imaged from the front (face is facing front, state shown in FIG. 5A).

3) The face direction determining section 43 determines whether any of the relative position indexes is contained in the third range, and determines that the authentication is that imaged from the upward direction (face is facing downward, state shown in FIG. 5C) if any of the relative position indexes is contained in the third range.

(Flow of Processes in the Image Analyzing Unit 4)

Figure 6:
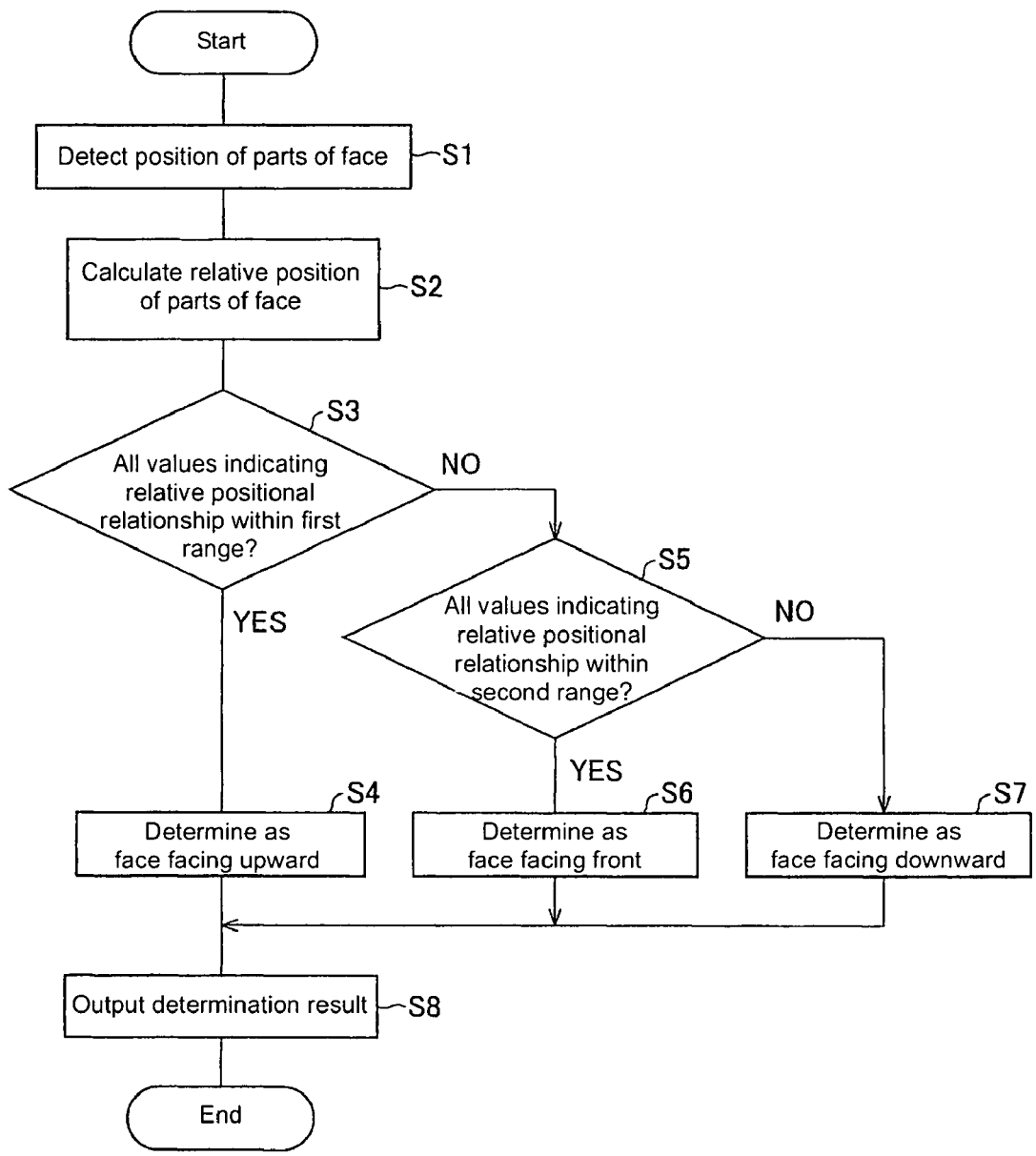
FIG. 6 shows a flow chart showing the flow of process in the image analyzing unit.

The flow of the process in the image analyzing unit 4 will now be described using FIG. 6. FIG. 6 is a flow chart showing the flow of process in the image analyzing unit 4.

As shown in FIG. 6, the absolute position detecting section 41 first detects the position of the feature of the face contained in the authentication image acquired by the camera 2 (S1), and outputs the relevant position information to the relative position calculating section 42.

When receiving the position information, the relative position calculating section 42 calculates the length (H out) in the Y axis direction of the outline 21, the position (H eye) of the eye, and the position (H nose) of the nose, and further calculates the relative position indexes (R eye, R nose, R mouth) indicating the position information of the eye, nose, and mouth with respect to the upper end of the outline 21 (S2). The relative position calculating section 42 then outputs each relative position index to the face direction determining section 43.

When receiving the relative position index, the face direction determining section 43 determines whether all of the relative position indexes are within the first range (S3).

If all of the relative position indexes are within the first range (YES in S3), the face direction determining section 43 determines that the face is facing upward (imaging direction is downward direction) (S4).

If at least one of the relative position index is outside the first range (NO in S3), the face direction determining section 43 determines whether each relative position index is within the second range (S5).

If all the relative position coordinates are within the second range (YES in S5), the face determining section 43 determines that the face is facing the front (imaging direction is front direction) (S6).

If at least one of the relative position index is outside the second range (NO in S5), the face direction determining section 43 determines that the face is facing downward (imaging direction is upward direction) (S7).

The face direction determining section 43 outputs the determination result to the imaging direction comparing unit 5 (S8).

(Determining Method in the Imaging Direction Comparing Unit 5)

The final determining method of the imaging direction in the imaging direction comparing unit 5 will now be described. The imaging direction comparing unit 5 determines the imaging direction of the authentication image in consideration of both information received from the tilt sensor 3 and the face direction determining section 43.

If both the information from the tilt sensor 3 and the determination result of the face direction determining section 43 indicate that the imaging direction is downward direction, or at least one of either the information from the tilt sensor 3 or the determination result from the face direction determining section 43 indicates that the imaging direction is downward direction, the imaging direction comparing unit 5 determines that the imaging direction is downward direction. As a result, the checking process is performed in the checking unit 6. Otherwise, the checking process is not performed.

The above determining method is as shown in the table below.

TABLE 1

| | Image use | | |
|---|---|---|---|
| Sensor use | Camera facing upward | Camera facing front | Camera facing downward |
| Image from below Camera facing upward | Check | Check | No check |
| Image from front Camera facing front | Check | No check | No check |
| Image from above Camera facing downward | No check | No check | No check |

In table 1, sensor use refers to the imaging direction determined from the tilt of the portable telephone 1 detected by the tilt sensor 3, and image use refers to the determination result of the imaging direction in the image analyzing unit 4 (face direction determining section 43).

The determining criteria may be made stricter, and the imaging direction may be determined as the downward direction only when both the information from the tilt sensor 3 and the determination result of the face direction determining section 43 indicate that the imaging direction is downward direction, whereby the checking process may be performed by the checking unit 6.

The determining method in this case is as shown in the table below.

TABLE 2

| | Image use | | |
|---|---|---|---|
| Sensor use | Camera facing upward | Camera facing front | Camera facing downward |
| Image from below Camera facing upward | Check | No Check | No check |
| Image from front Camera facing front | No Check | No check | No check |
| Image from above Camera facing downward | No check | No check | No check |

The imaging direction comparing unit 5 outputs the downward direction information indicating that the imaging direction is the downward direction when the finally determined imaging direction is downward direction, and the non-downward direction information indicating that the imaging direction is not the downward direction when the imaging direction is not the downward direction to the main control unit 8.

(Flow of Process in Portable Telephone 1)

Figure 7:
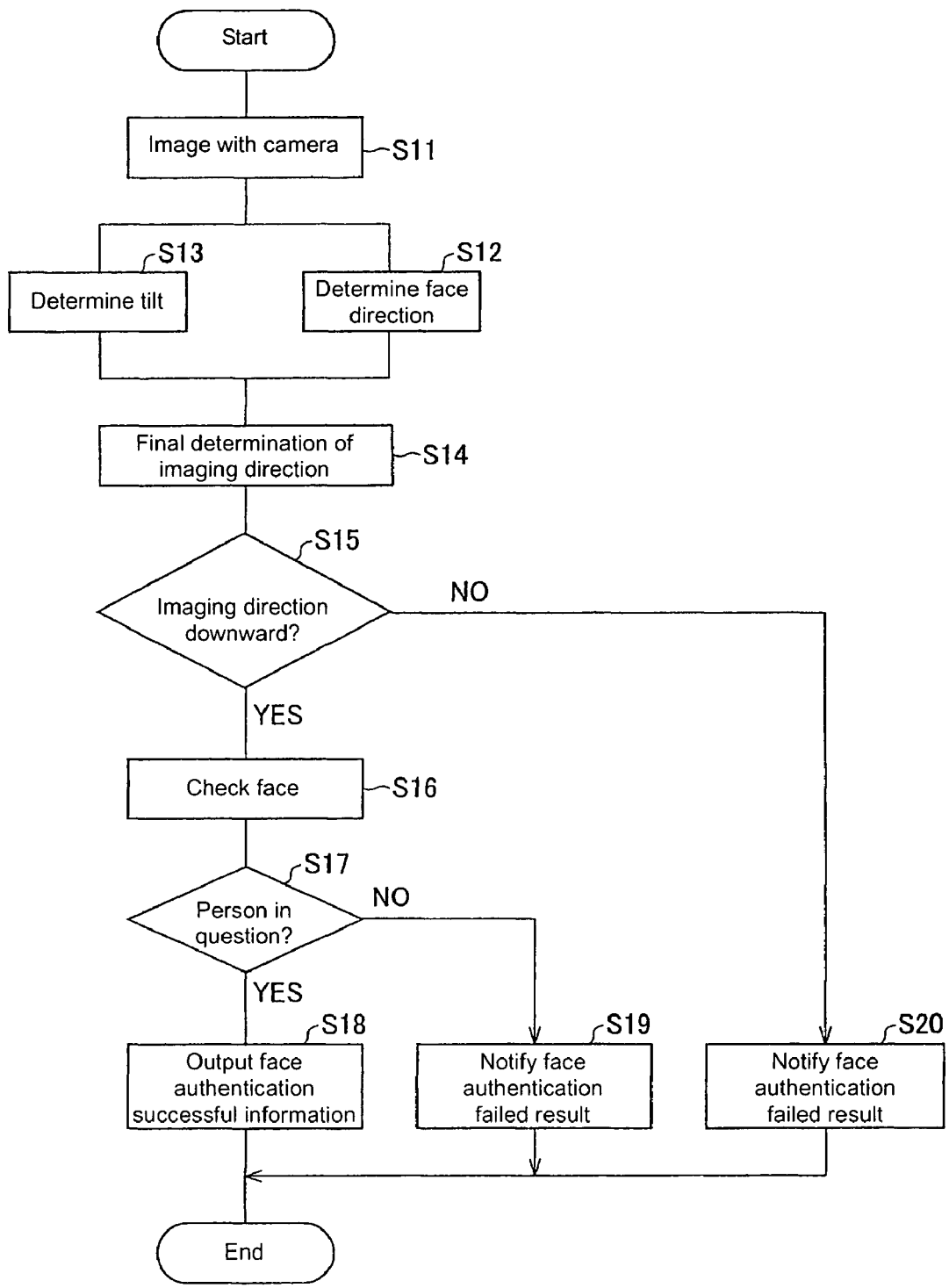
FIG. 7 shows a flow chart showing the flow of process in the portable telephone of one embodiment.
Figure 8:
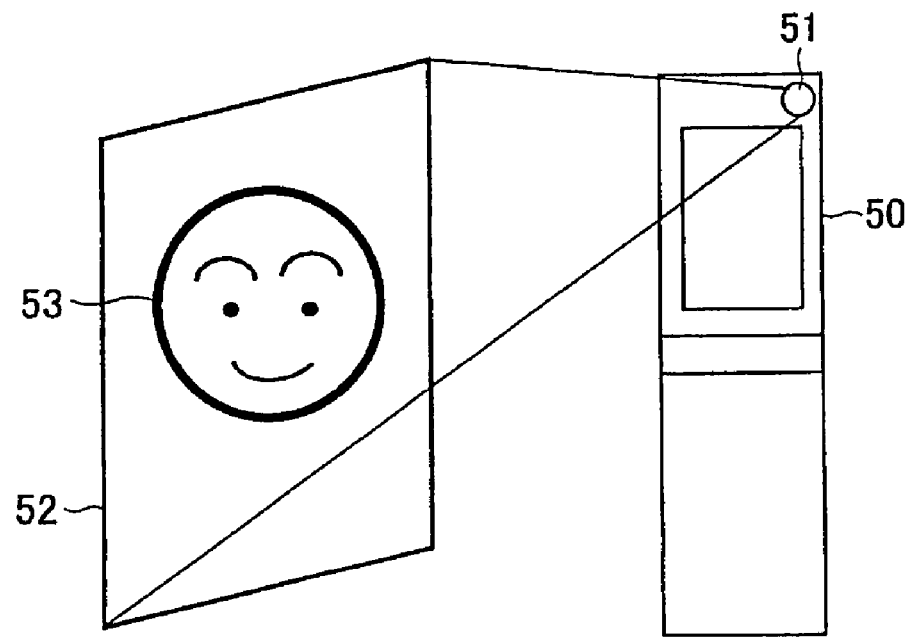
FIG. 8 shows a view explaining a method of carrying out spoofing using the photo of the person in question.

The flow of process in the portable telephone 1 will now be described with reference to FIG. 7. FIG. 7 is a flow chart showing the flow of the process in the portable telephone 1.

As shown in FIG. 7, the face of the user is first imaged by the camera 2 when the operation for acquiring the authentication image is made by the user through the input unit 9 (image acquiring step) (S11).

The acquired image (authentication image) is sent to the image analyzing unit 4, and the orientation (imaging direction) of the face in the authentication image is determined (S12). The determination result is output to the imaging direction comparing unit 5.

The tilt of the portable telephone 1 of when the authentication image is acquired is detected by the tilt sensor 3 (tilt detecting step) (S13), and the detection result is output to the imaging direction comparing unit 5.

When receiving information from the image analyzing unit 4 and the tilt sensor 3, the imaging direction comparing unit 5 determines the imaging direction in consideration of both information, as described above, (imaging direction determining step) (S14), and determines whether the final determination result is the downward direction (S15).

If the imaging direction is the downward direction (YES in S15), the imaging direction comparing unit 5 outputs the downward direction information to the main control unit 8.

When receiving the downward direction information, the main control unit 8 outputs a check command to the checking unit 6. In response to receiving the check command, the checking unit 6 checks the authentication image and the registered image stored in the database 7 (S16).

If the authentication image and the registered image match, that is, if determined that the person to be authenticated is the person in question (YES in S17), the checking unit 6 outputs the authentication successful information to the main control unit 8.

When receiving the authentication successful information, the main control unit 8 outputs the authentication successful information to the above mentioned application (S18).

If the authentication image and the registered image do not match (NO in S17), the checking unit 6 outputs the authentication failed information to the main control unit 8.

When receiving the authentication failed information, the main control unit 8 outputs the authentication failed information to the application, and notifies that the authentication has failed through the display unit 10 (S19).

If the imaging direction is not the downward direction (NO in S15), the imaging direction comparing unit 5 outputs the non-downward direction information to the main control unit 8.

When receiving the non-downward direction information, the main control unit 8 determines that the person to be authenticated is not the person in question (determination step), and outputs the authentication failed information to the application and also notifies that the authentication has failed through the display unit 10 (S20).

If the authentication is successful, the application performs the operation desired by the user. In this case, various communications may be performed between the external device and the portable telephone 1.

(Effect of Portable Telephone 1)

As described above, the portable telephone 1 determines whether or not the imaging direction of the authentication image is downward direction in the imaging direction comparing unit 5 in addition to the checking process in the checking unit 6. The resistance to spoofing thereby enhances.

In the image analyzing unit 4, the imaging direction can be determined without using the tilt detecting unit such as tilt sensor by determining the imaging direction from the positional relationship of the features of the face in the authentication image.

(Variant)

In the above configuration, the imaging direction comparing unit 5 ultimately determines the imaging direction based on the information from the image analyzing unit 4 and the tilt sensor 3, but the imaging direction comparing unit 5 may determine the imaging direction based on one of either the image analyzing unit 4 or the tilt sensor 3.

The main control unit 8 receives the non-downward direction information and determines that the person to be authenticated is not the person in question, and after a predetermined time, notifies the authentication failed result.

The time until the authentication result is given when the imaging direction is not the downward direction is shorter than when the imaging direction is the downward direction. This is because the checking process is performed in the checking unit 6 when the imaging direction is the downward direction.

Therefore, the person passing as the person in question may possibly sense that the checking process is not being performed if the authentication failed result is immediately notified when the imaging direction is not the downward direction. When sensing that the checking process is not being performed, such person may take some measures.

Therefore, when the imaging direction is not the downward direction and the checking process is not being performed by the above configuration, the checking process may be made to appear as if being performed to the person passing as the person in question when the checking process is not being performed, thereby reducing the possibility of spoofing being performed again.

The checking unit 6 and the database 7 may be arranged in the external device, and the portable telephone 1 and the relevant external device may communicate to perform the checking process.

In the above configuration, the outline of the face, eye, mouth and nose are given as features of the face, and the imaging direction is determined by the position of the eye, mouth and nose with respect to the upper end of the outline of the face, but the number of features and the type of features used in determining the imaging direction are not limited to the above. However, the imaging direction is preferably determined based on the position of a greater number of features in view of accuracy of determination. The features other than the eye, mouth and nose, for example, eyebrow may be used to determine the orientation of the face.

In the above configuration, the imaging direction is determined based on the arrangement of the features of the face in the Y axis direction, but the direction axis for obtaining the positional relationship of the features of the face is not limited to the Y axis, and may be any axis as long as it can be used to obtain the positional relationship of the features of the face.

The way of dividing the relative position index, and the determining method of the imaging direction in the face direction determining section 43 are merely one example, and may be appropriately changed. That is, the number of divided ranges for dividing the relative position index and the size of each divided range may be appropriately changed. For example, the range of the relative position index may be divided into two ranges of first range and second range, and determination can be made on whether or not the imaging direction is the downward direction by determining whether or not the relative position index is within the first range. Furthermore, the process procedures for determining to which divided range the relative position indexes fall and the way of combining each process are not limited to the above. For example, determination can be made whether the relative position indexes are of the second range, and thereafter, determine whether they are of the first range, or determination can be made on whether or not the position indexes fall into one certain divided range.

The final determining method of the imaging direction in the imaging direction comparing unit 5 is not limited to those shown in tables 1 and 2, and may be appropriately changed.

In the above configuration, the imaging direction is determined, and the checking process is performed in the checking unit 6 after the imaging direction is determined as the downward direction, but the processes related to the determination of the imaging direction and the checking process may be performed in parallel. The processing amount of when the person to be authenticated is not the person in question can be reduced, however, if the determination of the imaging direction is performed before, and thus is more preferable in terms of reducing the processing amount.

The portable telephone 1 is given by way of example of the authentication device of the present invention in the above description, but the authentication device merely needs to be a terminal device equipped with a camera, and may be a PAD (Personal Digital Assistance) or personal computer equipped with the camera.

Each block of the portable telephone 1 may be configured by hardware logic, or may be realized by software using the CPU as described below.

That is, the portable telephone 1 includes a CPU (Central Processing Unit) for executing the command of the control program for realizing each function, a ROM (Read Only Memory) for storing the program, a RAM (Random Access Memory) for expanding the program, a storage device (recording medium) such as memory for storing the program and various data etc.

The aim of the present invention is also realized by supplying the recording medium, on which the program code (executable format program, intermediate code program, source program) of the control program of the portable telephone 1 or the software for realizing the above described function is computer readably recorded, to the portable telephone 1 and having the computer (or CPU or MPU) read and execute the program code stored on the recording medium.

The recording medium used may be tapes such as magnetic tape and cassette tape; discs including magnetic discs such as Floppy Disc®/hard disc and optical disc such as CD-ROM/MO/MD/DVD/CD-R; cards such as IC card (include memory card)/optical card; or semiconductor memories such as mask ROM/EPROM/EEPROM/flash ROM.

The portable telephone 1 may be configured connectable to a communication network, and the program code may be supplied through the communication network. The communication network is not particularly limited, and internet, intranet, extranet, LAN, ISDN, VAN, CATV communication network, virtual private network, telephone line, mobile communication network, satellite communication network and the like may be used.

The transmission medium configuring the communication network is not particularly limited, and wired medium such as IEEE 1394, USB, power line carrier, cable TV line, telephone line, ADSL line and wireless medium such as infrared line such as IrDA and remote controller, Bluetooth®, 802.11 wireless, HDR, portable telephone network, satellite line, terrestrial digital network and the like may be used. The present invention can be realized in the form of carrier wave or data signal train in which the program code is realized in electronic transmission.

The present invention is not limited to each of the above embodiment, and various modifications within the scope of the claims are possible, and it should be recognized that embodiments obtained by appropriately combining the technical unit disclosed in each of the different embodiments are encompassed in the technical scope of the present invention.

The present invention is applicable to a device for performing authentication for identity verification since the possibility of mistaken authentication caused by spoofing is reduced.

What is claimed is:

1. An authentication device for performing individual verification by imaging a face of a person to be authenticated, the authentication device comprising:
   an imaging step of imaging the face of the person to be authenticated by an imaging device of the authentication device;
   an imaging direction determining step of determining whether the imaging device captured an image of the face of the person to be authenticated from a direction that is diagonally below the face of the person;
   a determining step of determining that the image captured is not of the person to be authenticated when the imaging direction determining step determines that the imaging device captures the image of the face of the person to be authenticated from a direction that is not diagonally below the face; and
   a checking step of performing a checking process to determine whether the person to be authenticated is a person in question, the checking step performing the checking process when the imaging direction determining step determines that the imaging device captures the image of the face from a direction that is diagonally below the face.

2. The authentication device according to claim 1, further comprising an image analyzing step of analyzing an authentication image, which is an image of the face of the person to be authenticated, acquired by the imaging device, and determining the orientation of the face in the authentication image, wherein the imaging direction determining step determines the imaging direction of the imaging device based on the analysis result of the image analyzing step.

3. The authentication device according to claim 2, wherein the image analyzing step includes, a position detecting step of extracting position information indicating the position of a plurality of features of the face in the authentication image;
   a relative position calculating step of calculating a relative position index indicating the relative positional relationship of the features based on the position information extracted by the position detecting step; and
   a face direction determining step of determining the orientation of the face in the authentication image based on the relative position index calculated by the relative position calculating step.

4. An authentication device for performing identity verification by imaging a face of a person to be authenticated; the authentication device comprising:
   an imaging step of imaging the face of the person to be authenticated by an imaging device of the authentication device;
   a tilt detecting step of detecting the tilt with respect to the horizontal plane of the imaging device;
   a determining step of determining that the image captured is not the person to be authenticated when the tilt detecting step detects that the imaging direction of the imaging device of when imaging the face of the person to be authenticated forms an angle other than an elevation angle in a direction from the horizontal plane; and
   a checking step of performing a checking process to determine whether the person to be authenticated is a person in question, the checking step performing the checking process when the tilt detecting step detects that the imaging direction forms an elevation angle from the horizontal plane.

5. An authentication method by the authentication device performing identity verification by imaging a face of a person to be authenticated, the method of comprising steps of
   imaging step of imaging the face of person to be authenticated by an imaging device of the authentication device
   imaging direction determining step of determining whether the imaging device captures an image of the face of the person to be authenticated from a direction that is diagonally below with respect to the face of the person;
   determining step of determining that the image captured is not of the person to be authenticated when determined in the imaging direction determining step that the imaging device captures the image of the face of the person to be authenticated from a direction that is not diagonally below the face; and
   performing step of performing a checking process to determine whether the person to be authenticated is a person in question, when the imaging direction determining determines that the imaging device captures the image of the face from a direction that is diagonally below the face.

6. An authentication method by the authentication device performing identity verification by imaging a face of a person to be authenticated, the method of comprising steps of:
   imaging step of imaging the face of person to be authenticated by a imaging device of the authentication device;
   tilt detecting step of detecting the tilt with respect to the horizontal plane of the imaging device in the imaging step;
   checking step of checking that the captured image is an image of the person to be authenticated when an imaging direction determining step determines that the imaging device captured the image of the face of the person to be authenticated from the direction that is diagonally below the face, but is not from a front of the face; and
   determining step of determining that the image captured is not of the person to be authenticated when the tilt detecting step determines that the imaging direction of the imaging device in the imaging step forms an angle other than an elevation angle in a direction from the horizontal plane, wherein the image of the face of the person that is not captured from the elevation angle formed direction results in an unauthorized image for authentication of the person.

7. A non-transitory computer readable recording medium recorded, containing an authentication program for causing a computer to implement an authentication method comprising the steps of:
   imaging step of imaging the face of the person to be authenticated by an imaging device of the authentication device;
   imaging direction determining step of determining whether the imaging device captures an image of the face of the person to be authenticated from a direction that is diagonally below the face of the person;
   determining step of determining that the image captured is not of the person to be authenticated when determined in the imaging direction determining step that the imaging device captures the image of the face of the person to be authenticated from the direction that is not diagonally below the face; and
   performing step of performing a checking process to determine whether the person to be authenticated is a person in question, when the imaging direction determining step determines that the imaging device captures the image of the face from a direction that is diagonally below the face.

8. The non-transitory computer readable recording medium according to claim 7, the authentication method further comprising the steps of:
image analyzing step of analyzing an authentication image, which is an image of the face of the person to be authenticated, acquired by the imaging device, and determining the orientation of the face in the authentication image,
wherein the imaging direction determining step determines the imaging direction of the imaging device based on the analysis result of the image analyzing step.

9. The non-transitory computer readable medium according to claim 8, wherein the image analyzing step includes the steps of:
position detecting step of extracting position information indicating the position of a plurality of features of the face in the authentication image;
relative position calculating step of calculating a relative position index indicating the relative positional relationship of the features based on the position information extracted by the position detecting step; and
face direction determining step of determining the orientation of the face in the authentication image based on the relative position index calculated in the relative position calculating step.

10. The non-transitory computer readable recording medium, containing an authentication program for causing a computer to implement an authentication method comprising the steps of:
imaging step of imaging a face of a person to be authenticated by an imaging device of the authentication device;
tilt detecting step of detecting the tilt with respect to the horizontal plane of the imaging device in the imaging step;
determining step of determining that the image captured is not of the person to be authenticated when the tilt detecting step determines that the imaging direction of the imaging device in the imaging step does forms an angle other than an elevation angle in a direction from the horizontal plane;
performing step of performing a checking process to determine whether the person to be authenticated is a person in question, when the tilt detecting detects that the imaging direction forms an elevation angle from the horizontal plane.

11. The authentication device according to claim 1, wherein the determining step determines that the image captured is not of the person to be authenticated when the imaging direction determining step determines that the imaging device did not capture the image of the face of the person to be authenticated from a position looking up to the face of the person to be authenticated.

* * * * *